United States Patent [19]
Kuo et al.

[11] Patent Number: 5,686,198
[45] Date of Patent: Nov. 11, 1997

[54] LOW COST STABLE AIR ELECTRODE MATERIAL FOR HIGH TEMPERATURE SOLID OXIDE ELECTROLYTE ELECTROCHEMICAL CELLS

[75] Inventors: Lewis J. H. Kuo, Monroeville; Prabhakar Singh, Export; Roswell J. Ruka, Churchill Boro; Theodore R. Vasilow, Penn Township; Raymond J. Bratton, Delmont, all of Pa.

[73] Assignee: Westinghouse Electric Corporation, Pittsburgh, Pa.

[21] Appl. No.: 608,889

[22] Filed: Feb. 29, 1996

[51] Int. Cl.$^6$ .................................................. H01M 8/10
[52] U.S. Cl. .................... 429/30; 429/31; 429/40; 264/61
[58] Field of Search ......................... 429/30, 31, 40; 264/61

[56] References Cited

U.S. PATENT DOCUMENTS

| | | | |
|---|---|---|---|
| 534,270 | 8/1895 | Vasilow et al. | 429/31 |
| 4,052,532 | 10/1977 | Tannenberger et al. | 429/33 |
| 4,133,778 | 1/1979 | Gray | 252/517 |
| 4,174,260 | 11/1979 | Schmidberger | 204/260 |
| 4,197,362 | 4/1980 | Schmidberger et al. | 429/12 |
| 4,562,124 | 12/1985 | Ruka | 429/30 |
| 4,645,622 | 2/1987 | Kock | 252/521 |
| 4,751,152 | 6/1988 | Zymboly | 429/31 |
| 4,767,518 | 8/1988 | Maskalick | 204/242 |
| 4,874,678 | 10/1989 | Reichner | 429/30 |
| 4,888,254 | 12/1989 | Reichner | 429/31 |
| 5,106,706 | 4/1992 | Singh et al. | 429/31 |
| 5,108,850 | 4/1992 | Carlson et al. | 429/31 |
| 5,277,995 | 1/1994 | Ruka et al. | 429/31 |

FOREIGN PATENT DOCUMENTS 0593281  10/1993  European Pat. Off. .

Primary Examiner—Prince Willis, Jr.
Assistant Examiner—Jonathan S. Krueger

[57] ABSTRACT

A low cost, lanthanide-substituted, dimensionally and thermally stable, gas permeable, electrically conductive, porous ceramic air electrode composition of lanthanide-substituted doped lanthanum manganite is provided which is used as the cathode in high temperature, solid oxide electrolyte fuel cells and generators. The air electrode composition of this invention has a much lower fabrication cost as a result of using a lower cost lanthanide mixture, either a natural mixture or an unfinished lanthanide concentrate obtained from a natural mixture subjected to incomplete purification, as the raw material in place of part or all of the higher cost individual lanthanum. The mixed lanthanide primarily contains a mixture of at least La, Ce, Pr, and Nd, or at least La, Ce, Pr, Nd and Sm in its lanthanide content, but can also include minor amounts of other lanthanides and trace impurities. The use of lanthanides in place of some or all of the lanthanum also increases the dimensional stability of the air electrode. This low cost air electrode can be fabricated as a cathode for use in high temperature, solid oxide fuel cells and generators.

22 Claims, 4 Drawing Sheets

5,686,198

LOW COST STABLE AIR ELECTRODE MATERIAL FOR HIGH TEMPERATURE SOLID OXIDE ELECTROLYTE ELECTROCHEMICAL CELLS

GOVERNMENT CONTRACT

The Government of the United States of America has rights in this invention pursuant to Contract No. DE-FC21-91MC28055, awarded by the United States Department of Energy.

FIELD OF THE INVENTION

The present invention relates to the field of high temperature, solid oxide electrolyte electrochemical cells and electrochemical generators for electrical power generation plants. This invention more particularly relates to air electrodes for such solid oxide electrolyte electrochemical cells that are extremely cost effective to manufacture commercially, since the air electrodes are made from lanthanide mixtures mainly comprising La, Ce, Pr, and Nd and other lanthanides, commercially available as unfinished lanthanide concentrates that are mined from rare earth oxide natural resources found in the earth and incompletely purified. And despite being made from such unfinished raw materials, the resultant air electrodes have excellent thermal expansion match properties with the solid oxide electrolyte and other components of the cells and appropriate low resistivities, porosities, and dimensional stability at the high operating temperatures of the cells. This invention further relates to the method for making such low cost stable air electrode materials from these unfinished lanthanide concentrates.

BACKGROUND OF THE INVENTION

High temperature, solid oxide electrolyte fuel cell configurations and fuel cell generators, are well known in the art, and are taught in U.S. Pat. Nos. 4,395,468 (Isenberg) and 4,490,444 (Isenberg). These fuel cell configurations include a plurality of individual, series and parallel electrically connected, axially elongated, usually tubular, solid oxide fuel cells ("SOFC"s) which generate electrical energy through electrochemical reactions between air and hydrocarbon fuel gas to produce a flow of electrons in an external circuit. Generators based on SOFCs offer a clean, pollution-free, approach for electrochemical generation of electricity with high efficiencies.

Each SOFC typically includes a porous, annular, open- or close-ended, axially elongated, electrically conductive, ceramic air electrode (or cathode) usually made of doped lanthanum manganite. The air electrode is a self-supporting structure. The outer surface of the air electrode is mostly covered by a dense, gas-tight, oxygen ion conductive, thin ceramic film solid electrolyte usually made of yttria-stabilized zirconia. The outer surface of the solid electrolyte is mostly covered with a thin, porous, electrically conductive, cermet fuel electrode (or anode) usually made of nickel-zirconia cermet. Both the solid electrolyte and the fuel electrode are discontinuous in a selected radial segment preferably along the entire active length of the fuel cell, for inclusion of a dense, gas-tight, electrically conductive, ceramic interconnect usually made of doped lanthanum chromite, which is in turn mostly covered by an electrically conductive metal, usually nickel, or a cermet usually made of nickel-zirconia cermet, to provide an electrical interconnection area for adjacent fuel cells. A compliant nickel felt is used to make series or parallel cell connections.

Each SOFC generates electrical energy at approximately 1,000° C. when air or oxygen gas is supplied in the annulus of the air electrode (cathode) where it is reacted (reduced) with incoming electrons from an external circuit, to form oxygen ions. The oxygen ions migrate through the solid electrolyte to the fuel electrode (anode). At the fuel electrode, hydrocarbon fuel gas is supplied over the fuel electrode disposed on the outside of the tubular fuel cell, and the oxygen ions combine with hydrogen gas and/or carbon monoxide gas (contained in the hydrocarbon fuel gas) and oxidize the fuel, to form water (steam) and/or carbon dioxide, and also liberating electrons. Electrons flow from the fuel electrode (anode) through the external circuit to the air electrode (cathode) and are collected for power generation.

The air electrode of the fuel cells are porous ceramic structures which generally have from about 20% to 40% porosity (60% to 80% of theoretical density) and also have good electrical conductivities (low resistivities) in a heated air environment for effective operation as the air electrode in the fuel cell. Specifically, the air electrode can be comprised of doped or undoped oxides in the perovskite ($ABO_3$) family, such as $LaMnO_3$ (with the A-site being the La ion and the B-site being the Mn ion), as discussed above, but may also include $CaMnO_3$, $LaCoO_3$, $LaCrO_3$, and the like. The usual air electrode used in high temperature, solid oxide fuel cells is $LaMnO_3$ doped with Ca or Sr in the A-site as a substitute for part of the La to improve the electrical conductivity of the material, for example, $La_{0.8}Ca_{0.2}MnO_3$ or $La_{0.8}Sr_{0.2}MnO_3$.

Many improvements have been made to the air electrode used in the solid oxide fuel cells over the years. Self-supporting high bulk air electrodes are taught in U.S. Pat. Nos. 4,751,152 (Zymboly) and 4,888,254 (Reichner). The preferred air electrode material in these patents comprises $LaMnO_3$ doped with Sr. In both Zymboly and Reichner, the air electrode is formed by extruding a mixture of individual high purity oxides or carbonates of La, Mn, and Sr into a tubular form, and then sintering the extruded "green" tube at from about 1,300° C. to about 1,600° C. to form a unitary self-supporting tubular air electrode body, upon which the superimposed solid electrolyte, and then the fuel electrode, can be deposited.

Thin self-supporting air electrodes are taught in U.S. Pat. No. 5,108,850 (Carlson et al.). The preferred air electrode material in this patent comprises sintered, doped $LaMnO_3$ with Ca of the general formula $La_{1-x}Ca_xMnO_3$, where x=0.1 to 0.25. In Carlson et al., the air electrode tube is formed by mixing a formable composition containing particles of calcium-doped lanthanum manganite, extruding or isostatic pressing the composition into a tube of circular cross-section, plugging one end of the tube with additional formable composition to close one end, and then heating to sinter the tube.

An exemplary air electrode of Carlson et al. is more particularly formed by first weighing out and then intimately dry blending individual high purity powdered oxides of La and Mn, such as $La_2O_3$ and $MnO_2$, respectively, together with individual powdered carbonates of Ca, such as $CaCO_3$, in appropriate proportions to give the desired calcium-doped lanthanum manganite composition after calcination. The mixed powder is then pressed into a cylindrical pellet shape, calcined at from about 1,300° C. to 1,700° C. for from about 3 to 5 hours, and crushed to form particles having a particle size between about 0.5 and 105 micrometers, which steps may be repeated a number of times to provide the desired homogeneity and small particle size. The ultimate crushed calcined powder of doped lanthanum manganite is then intimately mixed with from about 1% to 5% by weight of a decomposable cohesion agent, such as an organic starch, e.g., corn starch, rice starch, potato starch, or the like, to provide cohesion and plasticity for extrusion, from about 1% to 4% by weight of a decomposable pore-forming agent, such as an organic cellulose, e.g., maple wood flour, fiber cellulose, or the like, to provide gas permeability, from about 1% to 4% by weight of an organic, water-soluble binder, e.g., polyvinyl alcohol, polyvinyl acetate, paraffin wax emulsion, or the like, to provide dry strength for handling, and up to about 1% by weight of an optional wetting agent, such as naphthalene-sulfonic acid condensates, to help in extrusion, with the balance of the mixture constituting the crushed calcined powder, preferably from about 90 to 95% by weight. All dry powdered ingredients are intimately dry mixed together and then wet mixed with the water-soluble binder in a water solution to provide a wet formable mixture, which is appropriately aged for about 6 to 12 hours.

This aged formable mixture is then extruded or isostatic-pressed into a tubular shape. An optional solid cylindrical plug of the formable mixture is then pushed into one end of the tube a selected distance to close one end of the tube. The closed tube is then dried, and next heated in air from about 1,300° C. to 1,700° C. for about 1 hour to sinter the tube walls and plug together, and to vaporize the cohesion agent, binder and pore-forming agent. The resultant structure is a consolidated sintered air electrode tube having a density between about 60% and 85% of theoretical density. The tube is then cut along the closed end and the closed end is smoothed or rounded or otherwise finished prior to deposition of the solid electrolyte, fuel electrode, and interconnect.

Both Sr-doped and Ca-doped lanthanum manganite formulations, however, were found to be dimensionally unstable, i.e., the air electrode shrank in length during thermal cycling, when such air electrodes Were used during fuel cell operation, and, consequently, the life expectancy of the cell suffered. EP 0 593 281 A2 (Takao et al.) taught that B-site doping with Ni, Al or Mg in both Sr- and Ca-doped lanthanum manganite air electrodes improved the coefficient of thermal expansion and significantly reduced the cyclic shrinkage and dimensional stability problems of the fuel cell. However, a common drawback with all of these compositions as well was that their coefficient of thermal expansion was not matched close enough with that of the yttria-stabilized zirconia solid electrolyte to result in the most effective air electrode material.

U.S. Pat. No. 4,562,124 (Ruka) identified thermal expansion problems with the air electrode material of the fuel cells. Ruka taught that the difficulty in constructing fuel cells using doped lanthanum manganite ($LaMnO_3$) air electrodes was that when the lanthanum manganite was doped with calcium (Ca) or strontium (Sr) to have the highest electrical conductivity, the resulting air electrode would have a higher coefficient of thermal expansion than some of the other materials typically used in making the fuel cells, such as those used for the solid oxide electrolyte, for example, yttria- or calcia-stabilized zirconia. Accordingly, if the thermal expansion of the various fuel cell components are mismatched, the fuel cells tend to crack as a result of excess shrinkage of the air electrode during thermal cycling between high temperatures of fabrication or between operation and room temperatures. This would render the fuel cells drastically less effective in power generation operations.

Ruka taught that the addition of small amounts of cerium (Ce) into the air electrode material of doped $LaMnO_3$ or $LaCrO_3$ doped with calcium (Ca) or strontium (Sr) reduced the coefficient of thermal expansion and helped the thermal expansion match with stabilized zirconia electrolytes. Ruka taught for the air electrode a sintered, single phase, solid solution with a perovskite-like crystal structure of the general formula $La_{1-x-w}(M_L)_x(Ce)_w(M_{S1})_{1-x}(M_{S2})_yO_3$, where $M_L$=Ca, Sr or Ba; $M_{S1}$=Mn or Cr; and $M_{S2}$=Ni, Fe, Co, Ti, Al, In, Sn, Mg, Y, Nb or Ta; w=0.05 to 0.25; x+w=0.1 to 0.7; and y=0 to 0.5. Preferred compounds were $La_{0.3}Ca_{0.5\ to\ 0.6}Ce_{0.2\ to\ 0.1}MnO_3$. In Ruka, again these solid solution, perovskite-like crystal structure, air electrode compositions of lanthanum manganite or lanthanum chromite were formed by homogeneously mixing together individual high purity powdered oxides, carbonates, or other compounds that form oxides upon heating, such as oxalates, of the air electrode elements in the appropriate proportions, pressing the powdered mixture into a tubular shape, and sintering at about 1,400° C. to 1,800° C. for about 1 to 4 hours, to form the axially elongated, tubular, air electrode with a density of the sintered oxide that does not exceed about 80% of theoretical density, to permit surrounding oxidant gases (air or oxygen) to permeate to the air electrode-electrolyte interface.

U.S. Pat. No. 5,342,704 (Vasilow et al.) taught a porous air electrode material with use of a rare earth metal additive, such as cerium, having improved sinterability, to control the percent porosity of the sintered air electrode material to a final porosity from about 20% to 40% porosity (60% to 80% of theoretical density). In Vasilow et al., the air electrode material had the general formula $La_{1-x}(M)_xCe_{0.010\ to\ 0.045}MnO_3$, where M=Ca, Sr or Cr and x=0.2 to 0.4. The air electrodes of Vasilow et al. were also formed by forming a powder of doped lanthanum manganite, such as calcium doped lanthanum manganite, made from individual high purity oxides or carbonates of the metals, and mixing this powder with an additive powder which contains an individual high purity rare earth metal, such as individual high purity oxides of cerium. The powdered mixture is then molded by isostatic pressing, or usually by extrusion with appropriate organic binders, such as polyvinyl alcohol, methyl cellulose, starch or the like, and then sintered in air at from about 1,000° C. to 1,750° C. for about 1 to 6 hours. The sintered structure is then cooled, to form a unitary sintered tubular mass with controlled porosity, and the other fuel cell components are deposited on this structure.

As seen from the above patents, several formulations of doped lanthanum manganite air electrode materials have been proposed and also successfully used for fabricating solid oxide fuel cells. However, during thermal cycling, tubular, axially elongated, solid oxide electrolyte fuel cells containing the above air electrode formulations can still be improved in terms of thermal match properties with the solid electrolyte, to prevent the fuel cells from cracking on occasion due to excessive shrinkage during thermal cycling and which in turn results in less efficient electrical power generation capabilities.

Moreover, all of the above designed air electrode formulations are very expensive to formulate, since they are made from high purity individually separated ingredients, namely individual high purity powdered oxides and carbonates of the constituent metals. In particular, the individual high purity lanthanum oxide powders have proved to be extremely costly components of the air electrode material. For example, in order to obtain individual high purity lanthanum oxide, lanthanum mined from the rare earth oxide natural resources found in the earth has to go through a number of selective separation and purification processes to yield the desired individual lanthanum oxide, which processes greatly increase the cost of these individual materials. Excessive cost of the air electrodes will ultimately hinder the attractiveness of any commercial production of SOFCs and SOFC generators. The cost of the air electrode is extremely important because this component contains the bulk of the fuel cell material. Thus, in order for solid oxide electrolyte fuel cells and generators to become commercially viable, the air electrode cost must be significantly reduced but without a corresponding degradation in the thermal match properties, porosities, electrical resistivities, and thermal and dimensional stabilities during isothermal and thermal cyclic exposure conditions of the air electrode.

What is needed is an air electrode for a solid oxide fuel cell and generator which has a good thermal expansion match with the solid oxide electrolyte, good low resistivity in a heated air environment, good porosity, and good thermal and dimensional stability, and, furthermore, is significantly less expensive to fabricate than conventional air electrodes.

SUMMARY OF THE INVENTION

It is an object of the invention to provide a high temperature, solid oxide fuel cell which contains an air electrode with good gas permeability, good electrical conductivity in a heated atmosphere, and good thermal and dimensional stability during isothermal and thermal cycling conditions.

It is another object of the invention to provide an air electrode for a solid oxide fuel cell that has a closer thermal expansion match with the solid oxide electrolyte.

It is still another object of the invention to provide an air electrode for a solid oxide fuel cell from less pure ingredients than those used in conventional air electrodes that is cost effective to fabricate in the construction of solid oxide fuel cells and generators.

It is yet another object of the invention to provide an air electrode for a solid oxide fuel cell from lanthanide mixtures, such as commercially available unfinished lanthanide concentrates that are mined from rare earth oxide natural resources in the earth and incompletely purified, as a substitute for the more expensive individual lanthanum oxides of the air electrode.

It is yet another object of the invention to provide a method of making an air electrode of a solid oxide fuel cell from relatively inexpensive lanthanide mixtures, such as commercially available lanthanide concentrates mined from rare earth oxide natural resources in the earth and incompletely purified.

In one aspect, the invention resides in a method of making a low cost, lanthanide-substituted, dimensionally and thermally stable, electrically conductive, porous ceramic air electrode structure which is characterized by the steps of: (a) providing powdered oxides or carbonates of a natural lanthanide mixture of at least two lanthanides from the group of La, Ce, Pr, Nd, Sm and other lanthanides (i.e., Eu, Gd, Tb, Dy, Ho, Er, Tm, Yb, and Lu); (b) providing powdered oxides or carbonates of individual species of La and Mn, at least one A-site dopant from the group of individual species of Ca, Sr, Ba, and Ce, and, at least one B-site dopant from the group of individual species of Mg, Ni, Cr, Al and Fe; (c) blending together said powdered oxides or carbonates of the lanthanide mixture with said powdered oxides or carbonates of said individual species of La and Mn, said at least one A-site dopant from the group of individual species of Ca, Sr, Ba, and Ce, and, said at least one B-site dopant from the group of individual species of Mg, Ni, Cr, Al and Fe, in appropriate proportions to provide a desired lanthanide-substituted doped $LaMnO_3$ composition after calcining; (d) pressing the blended powder into a shape; (e) calcining the pressed shape at a temperature of from about 1,300° C. to 1,750° C. for about 1 to 5 hours; (f) pulverizing the calcined shape to powder form; (g) blending the calcined powder with at least one from the group of a cohesion agent, a pore-forming agent, a water-soluble binder, a wetting agent, and water to provide a formable mixture, where the calcined powder constitutes from about 90% to 95% by weight of the formable mixture; (h) molding, preferably extruding, the formable composition into a shaped air electrode structure; and, (i) sintering the shaped air electrode structure in air at a temperature of from about 1,300° C. to 1,750° for about 1 to 6 hours, to form a porous, shaped, air electrode structure of the lanthanide-substituted doped $LaMnO_3$ composition. It is preferred that the air electrode is molded into a tube with a closed end. The lanthanide mixture preferably comprises primarily at least La, Ce, Pr and Nd or primarily at least La, Ce, Nd, Pr, and Sm, although minor amounts of other lanthanides and trace impurities can be present. The air electrode formed by the method preferably has a porosity from about 20 to 40% by volume (60% to 80% of theoretical density), a coefficient of thermal expansion from about $10.4 \times 10^{-6}$ to $10.6 \times 10^{-6}$/°C. in the range of about 25° C. to 1,000° C., and an electrical resistivity of from about 10 to 25 $\Omega$-cm at about 1,000° C.

In another aspect, the invention resides in a low cost, lanthanide-substituted, dimensionally and thermally stable, electrically conductive, porous air electrode composition, characterized by the chemical formula (1):

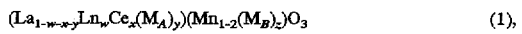

$$(La_{1-w-x-y}Ln_w Ce_x(M_A)_y)(Mn_{1-z}(M_B)_z)O_3 \qquad (1),$$

where Ln is a lanthanide mixture, natural or preferably unfinished concentrate, selected from a mixture of at least two, at least three, at least four, or at least five or more of La, Ce, Pr, Nd, Sm, and other lanthanides, with the proviso that if Ln comprises a mixture of only two lanthanides, the mixture is not the combination of La and Ce; La and Ce are selected from individual species of La and Ce, respectively; $M_A$ is an A-site dopant for electrical conductivity selected from individual species of at least one of Ca, Sr or Ba, or mixtures thereof; $M_B$ is a B-site dopant for dimensional stability selected from individual species of at least one of Mg, Ni, Cr, Al or Fe, or mixtures thereof; w is from about 0.05 to 0.9, or from about 0.1 to 0.9, or from about 0.4 to 0.8; x is from about 0 to 0.1; y is from about 0.1 to 0.2; and, z is about 0.05 to 0.1 mole per mole of formula (1). The Ln of the air electrode composition preferably comprises a mixture of primarily at least La, Ce, Pr, Nd or primarily at least La, Ce, Pr, and Sm. The air electrode composition preferably has a porosity from about 20 to 40% porous by volume (60% to 80% of theoretical density), an electrical resistivity at 1,000° C. is from about 10 to 25 $\Omega$-cm, and, a coefficient of thermal expansion in the range of from about 25° C. to 1,000° C. is from about $10.4 \times 10^{-6}$ to $10.6 \times 10^{-6}$/°C. The air electrode composition is preferably tubular and has a dense, gas-tight, oxygen ion conductive, yttria- or calcia-stabilized zirconia ceramic solid electrolyte on the outer periphery of the air electrode to contact and substantially surround the air electrode, a porous nickel- or cobalt-zirconia cermet fuel electrode on the outer periphery of the solid electrolyte to contact and substantially surround the solid electrolyte, in order to form a solid oxide fuel cell.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS OF THE INVENTION

A high temperature, solid oxide fuel cell generator includes a gas-tight, thermally insulated housing which houses individual chambers including, without limitation, a generator chamber and combustion chamber. The generator chamber, in which power generation occurs, contains a solid oxide fuel cell stack which is made up of an array of a plurality of axially elongated, tubular, series-parallel connected solid oxide fuel cells, and associated fuel and air distribution equipment. The solid oxide fuel cells contained in the generator chamber can take on a variety of well known configurations, including tubular, flat plate, and corrugated designs which are taught in U.S. Pat. Nos. 4,395,468 (Isenberg) and 4,490,444 (Isenberg) for tubular SOFCs, U.S. Pat. No. 4,476,196 (Poppel et al.) for flat plate SOFCs, and U.S. Pat. No. 4,476,198 (Ackerman et al.) for corrugated SOFCs, which disclosures are incorporated by reference herein in their entireties. However, for purposes of simplicity, tubular solid oxide fuel cells will be discussed as an exemplary type useful in this invention, and the description hereafter will generally relate to that type, which shall in no way be considered limiting as to the scope of the invention.

Figure 1:
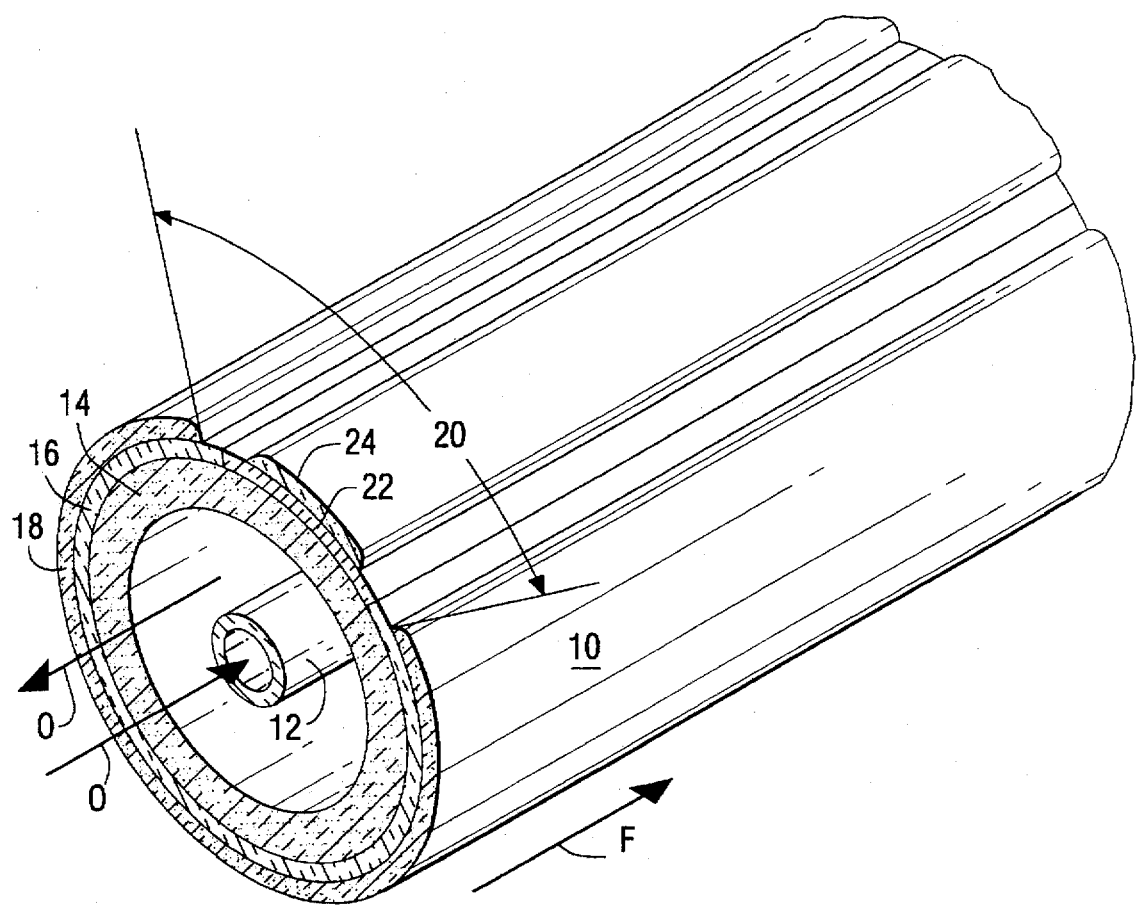
FIG. 1 is a schematic, sectional view of a preferred embodiment of a tubular, solid oxide fuel cell which includes a low cost and stable air electrode made in accordance with this invention.

Referring now to FIG. 1, a preferred, tubular, axially elongated, high temperature, solid oxide fuel cell 10 is shown. The preferred configuration is based upon a fuel cell system in which a flowing gaseous fuel, such as natural gas, hydrogen or carbon monoxide, is directed axially over the outside of the fuel cell, as indicated by the arrow F, and a flowing oxidant, such as air or oxygen, is fed through an optional riser tube 12, positioned within the annulus of the fuel cell and extending near the closed end of the fuel cell, and then out of the riser tube and back down the fuel cell axially over the inside wall of the fuel cell, as indicated by the arrow O. Where the fuel cell 10 is as shown, and operated at a high temperature of approximately 1,000° C., oxygen molecules pass from the oxidant through a porous, electrically conductive, tubular air electrode 14 (or cathode), and are changed to oxygen ions at the air electrode-solid electrolyte interface. The oxygen ions then diffuse through a dense, gas-tight, oxygen ion conductive, solid oxide electrolyte 16, to combine with fuel gas at a porous, electrically conductive, fuel electrode 18 (or anode), and release electrons at the fuel electrode-solid electrolyte interface, which are collected at the air electrode, thus generating a flow of electrons in an external load circuit (not shown). For a more complete description of the materials, configurations and operation of an exemplary tubular solid oxide fuel cell and solid oxide fuel cell generators of tubular configurations which contain a plurality of series-parallel connected fuel cells, reference can be made to U.S. Pat. No. 4,395,468 (Isenberg) and 4,490,444 (Isenberg), which disclosures are incorporated by reference herein in their entireties.

The tubular solid oxide fuel cell design features a tubular, axially elongated (approximately 50 to 230 cm long) air electrode 14. The air electrode 14 (or cathode) that is, the electrode which will be in contact with the oxidant such as air or oxygen, is a porous, electrically conductive, preferably self-supporting structure, typically made of doped lanthanum manganite ($LaMnO_3$) preferably doped with calcium, strontium, barium or cerium in the A-site and chromium, nickel, magnesium, aluminum or iron in the B-site of its $ABO_3$ perovskite crystal structure (approximately 1 to 3 mm thick) and, which is generally extruded or isostatically pressed into tubular shape and then sintered. An optional porous, calcia-stabilized zirconia support tube (not shown) generally surrounding the inside of the annulus of the air electrode can be used, if necessary, to provide additional structural support to the air electrode. As shown in FIG. 1, the air electrode 14 is thin and of low volume design, so that only one oxidant feed tube 12 need be used. Reference can be made to U.S. Pat. No. 5,108,850 (Carlson et al.) for a more detailed description of this thin, low volume, self-supporting air electrode configuration, which disclosure is incorporated by reference herein in its entirety. Such a self-supporting air electrode structure is relatively less expensive, simplifies the manufacturing process, and allows improved cell performance.

Surrounding most of the outer periphery of the air electrode 14 is a layer of a dense, gas-tight, oxygen ion permeable, solid electrolyte 16, typically made of calcia- or yttria-stabilized zirconia (approximately 0.001 to 0.1 mm thick). The solid electrolyte 16 can be deposited onto the air electrode by well known, high temperature, electrochemical vapor deposition (EVD) techniques as taught in U.S. Pat. Nos. 4,597,170 (Isenberg) and 4,609,562 (Isenberg et al.), which disclosures are incorporated by reference herein in their entireties. A preferred solid electrolyte composition is $(Y_2O_3)_{0.1}(ZrO_2)_{0.9}$.

A selected radial segment 20 (approximately 9 mm wide) of the air electrode 14, preferably extending along the entire active cell length, is masked during fabrication of the solid electrolyte, and covers a thin, dense, gas-tight, interconnection 22, which provides an electrical contacting area to an adjacent cell (not shown) or to a power contact (not shown), as is well known in the art. The dense, gas-tight, interconnection 22, covering the surface of the air electrode 14 along the radial segment 20, as shown, must be electrically conductive in both an oxidant and fuel environment at elevated temperatures. The gas-tight interconnection 22, typically made of lanthanum chromite ($LaCrO_3$) doped with calcium, barium, strontium, magnesium or cobalt (approximately 0.03 to 0.1 mm thick), is roughly similar in thickness to the solid electrolyte. The interconnection should be non-porous (over about 95% dense) and electrically conductive at 1,000° C., the usual operating temperature of the fuel cell. The interconnection can be deposited onto the air electrode by high temperature, electrochemical vapor deposition (EVD) techniques as taught in U.S. Pat. Nos. 4,597,170 (Isenberg) and 4,609,562 (Isenberg et al.), both previously incorporated by reference, or by plasma spraying as taught in U.S. Pat. No. 5,389,456 (Singh et al.), which disclosure is incorporated by reference herein in its entirety. An electrically conductive top layer 24 can be deposited over the interconnection 22, typically made of nickel, nickel-zirconia or cobalt-zirconia cermet, typically of the same composition as the fuel electrode (approximately 0.05 to 0.1 mm thick).

Surrounding the remainder of the outer periphery of the fuel cell, on top of the solid electrolyte 16, except at the interconnection area, is the fuel electrode 18 (or anode), that is the electrode which will be in contact with the fuel. The fuel electrode 18 is a thin, electrically conductive, porous structure, typically made of nickel-zirconia or cobalt-zirconia cermet (i.e., a metal ceramic) (approximately 0.03 to 0.1 mm thick). As shown, the solid electrolyte 16 and fuel electrode 18 are discontinuous, the fuel electrode being spaced-apart from the interconnection 22 to avoid direct electrical contact. A major portion of the fuel electrode 18 is a skeletal extension of the yttria-stabilized zirconia solid electrolyte material. The fuel electrode 18 and top layer 24 can be deposited on the solid electrolyte and interconnection, respectively, by well known techniques such as dipping or spraying, and may be anchored more securely by electrochemical vapor deposition (EVD) as taught in U.S. Pat. Nos. 4,582,766 (Isenberg et al.) and 4,597,170 (Isenberg), which disclosures are incorporated by reference herein in their entireties. Both electrodes are electrically conductive at 1,000° C., the usual fuel cell operating temperature. The self-supporting fuel cell configuration and the materials and methods used for the solid electrolyte, interconnection, and fuel electrode are well known, and described in U.S. Pat. Nos. 4,562,124 (Ruka), 4,751,152 (Zymboly), and 5,108,850 (Carlson, et al.), which disclosures are incorporated by reference herein in their entireties.

In operation at approximately 1,000° C., a gaseous fuel, such as hydrogen ($H_2$) or carbon monoxide (CO), or sometimes natural gas (primarily comprising methane), is directed over the outside of the fuel cell, and a source of oxygen, such as air or oxygen ($O_2$), is passed through the inside of the fuel cell. The oxygen molecules pass through the porous electrically conductive air electrode and form oxygen ions at the air electrode-solid electrolyte interface. The oxygen ions then migrate through the solid electrolyte material to combine with the fuel at the fuel electrode-electrolyte interface and release electrons at the fuel electrode, which are then collected at the air electrode through an external load circuit, thus generating a flow of electrical current in the external circuit from the fuel electrode (anode) to the air electrode (cathode). The electrochemical reaction of oxygen with fuel thus produces a potential difference across the external load which maintains a continuous electron and oxygen ion flow in a closed circuit during the generation of useful electricity. A plurality of similar cells can be electrically connected in series by contact between the interconnection of one cell and the fuel electrode of another cell. The plurality of similar cells can also be electrically connected in parallel by contact between the fuel electrode of one cell and the fuel electrode of another cell. A more complete description of the operation of this type of fuel cell can be found in U.S. Pat. No. Re. 28,792 (Ruka), which disclosure is incorporated by reference herein in its entirety.

The porous air electrode remains exposed to the hot oxidant gas atmosphere, usually air, heated to approximately 1,000° C. during generator operation, and oxygen reduction takes place at the air electrode-electrolyte interface. In the tubular fuel cell configuration, the porous, electrically conductive, air electrode maintains intimate contact with the dense, gas-tight, oxygen ion conductive, solid electrolyte, and dense, gas-tight, electrically conductive, interconnection fill, and also with the optional porous support tube when used. The selection of a suitable air electrode must be done carefully to ensure that the air electrode has certain properties including, without limitation, high conductivity (low resistivity) at the high operating temperatures, low resistance contact to the solid electrolyte, good chemical (interaction or interdiffusion) stability and structural and dimensional stability at the high operating temperatures, sufficient gas permeation porosity, and good match of the coefficient of thermal expansion with the solid electrolyte and interconnection.

Structural and dimensional stability of the air electrode, in particular, is an important criteria for maintaining long term mechanical integrity necessary for successful fuel cell operations, especially under isothermal or thermal cycling during cell fabrication and operation. For example, a typical air electrode of a fuel cell ranges in length from about 50 cm to 230 cm. If the air electrode length was 100 cm long, the total heat shrinkage of even 0.05% in length of the air electrode in contact with the solid electrolyte and interconnection would result in a 0.5 mm difference in length between the air electrode and the solid electrolyte or the interconnection. This would result in severe stresses between the materials. A marginal total heat shrinkage of the air electrode length would be from about 0.03% to 0.04%, and long life commercially acceptable heat shrinkage values are thought to be below about 0.02%.

All components of the fuel cell except the air electrode generally remain, under operating conditions, stable to shrinkage when subjected to certain isothermal (i.e., oxygen partial pressure cycling) conditions or as a result of thermal cycling during cell fabrication and operation. This tendency to shrink is resisted by the adjoining solid electrolyte and interconnection and translates into stresses between the air electrode and adjoining components and, in some cases, can result in cracking failure of individual fuel cells, hampering electrical power generation of a multi-cell generator. It is thus desired to produce an air electrode material with a better match of its coefficient of thermal expansion with that of the solid electrolyte and interconnection in order to reduce such dimensional shrinkage of the air electrode material, while also producing a low cost structure in order to improve the commercial attractiveness of these fuel cells, but without impairing the other desirable air electrode properties such as good low resistivity and controlled porosity.

The porous, preferably self-supporting, air electrode of this invention provides a material which has better thermal expansion match with the adjoining components of the fuel cell, such as the solid electrolyte and interconnection, in order to improve the dimensional stability and reliability of the fuel cells during cell fabrication and operation, and further is attractive because of its relatively lower cost to fabricate as compared to fabrication costs for conventional fuel cells. The air electrode of this invention also provides a material which has good structural and dimensional stability to self-support the air electrode tube, good porosity for oxidant permeation, and good low resistivity at high temperature for effective electricity generation.

The lower cost of fabrication of the air electrode of this invention results from the use of lower purity raw materials rather than the typically used individually separated higher purity raw materials in conventional air electrodes. In this invention, lanthanide mixtures mainly comprising at least La, Ce, Pr, and Nd, or at least La, Ce, Pr, Nd, and Sm, such as commercially available unfinished lanthanide concentrates mined from rare earth oxide natural resources in the ground and incompletely selectively separated into their individual components, are substituted in the air electrode material for some higher cost individual species of lanthanum, commercially available as individual lanthanum oxides and carbonates, that have been subjected to extensive selective separation and purification processes. The unfinished lanthanum concentrates in the past served as the raw material for the manufacture of individual lanthanum compounds, such as individual lanthanum oxide. This low cost lanthanide mixture substitution for individual lanthanum in the air electrode also provides, unexpectedly, better results than prior art compositions not only in terms of its lower fabrication cost, but also in terms of better thermal expansion match with the solid electrolyte and interconnection. Past air electrode formulations suffered from both dimensional stability problems as a result of the thermal expansion mismatch and high fabrication costs from the use of relatively expensive pure individual lanthanum compounds, such as pure individual lanthanum oxides and lanthanum carbonates, as the air electrode raw materials. Both of these problems are avoided in the present invention.

The lanthanides (i.e., rare earth metals), include 15 elements in the periodic table which are: lanthanum, cerium, praseodymium, neodymium, promethium, samarium, europium, gadolinium, terbium, dysprosium, holmium, erbium, thulium, ytterbium, and lutetium (La, Ce, Pr, Nd, Pro, Sm, Eu, Gd, Tb, Dy, Ho, Er, Tm, Yb, and Lu, respectively). Except for Pm, the lanthanides (sometimes expressed by rare earth companies as $Ln_2O_3$) are not uncommon and occur naturally as mixtures in rock formations and sands throughout the world although sizable deposits are few in number. Lanthanides are typically found in three minerals which are monazite and bastnasite for light lanthanides and xenotime for heavy lanthanides and yttrium (another rare earth metal). Monazite and bastnasite are the two minerals that are mined commercially to supply the world with most of the rare earth chemicals. Bastnasite, a fluorocarbonate ($Ln_2F_3(CO_3)_3$), contains about 90% La, Ce, Pr and Nd metals in its lanthanide content in the natural mixture and is the chief source of commercial supply of lanthanides. Monazite, an thorium orthophosphate ($LnPO_4$) also contains about 90% La, Ce, Pr, and Nd metals in its lanthanide content in the natural mixture and some thorium ($ThO_2$) and is the second source of commercial importance. The main deposit of bastnasite is in the Mountain Pass area of California (90% of U.S. and 66.6% of world output).

An industrial demand currently exists for individual lanthanides, and rare earth companies have devised extensive rare earth ore extraction, separation, and purification systems to isolate the individual lanthanides from the natural lanthanide mixtures present in the raw minerals. Cerium is generally the most abundant lanthanide in the natural lanthanide mixture comprising up to about 50% of the natural mixture. Cerium is presently in the highest demand and commands the highest market price. Therefore, the rare earth companies routinely first selectively separate cerium from the mineral deposits, leaving an unfinished by-product lanthanide concentrate containing the remaining unseparated natural lanthanide mixtures less most of its cerium content. For a detailed description of bastnasite and monazite rare earth ore extraction, separation, and purification techniques, which are well known in the art, reference can be made to Kirk-Othmer, *Concise Encyclopedia of Chemical Technology*, John Wiley & Sons, Inc., New York, N.Y. (1985), pp. 204–242 and 997–998, which disclosure is incorporated by reference herein in its entirety.

Further industrial demand for other individual lanthanides, such as individual lanthanum, especially for use in air electrode compositions of solid oxide fuel cells, also exists. However, separation of individual lanthanides, such as lanthanum, commercially from the unfinished lanthanide mixture, such as the lanthanide concentrate by-product, or even from a natural lanthanide mixture involves extensive separation and purification processes which in turn increases the overall cost of these metals as raw materials drastically. Therefore, to keep raw material costs down for the doped lanthanum manganite ($LaMnO_3$) air electrode materials, it is desirable to use lanthanum compounds in a less pure form other than its individual form, such as individual $La_2O_3$, $LaCO_3$, or the like, which is currently the material of choice for fabrication of the air electrodes. The inventors have located a lower cost alternative previously considered as an unacceptable intermediate material which, consequently, heretofore was ignored in the solid oxide fuel cell industry as a raw material for the air electrodes. This alternative material is this unfinished (concentrated) natural lanthanide (Ln) mixture which contains lanthanum and other lanthanides, usually containing La, Nd, Pr, and sometimes Sm in varying natural amounts, minor amounts of Ce remaining from the previous selective separation, and trace impurities. This unfinished lanthanide concentrate material typically served as the raw material for the production of individual lanthanum compounds.

The low cost lanthanide mixtures are thus substituted at the A-site of the air electrode for some of the lanthanum in this invention. In 1995, unfinished lanthanide mixtures ("lanthanide concentrates") were priced at $3.00(USD)/kg, whereas individual pure lanthanum carbonates were priced at $13.75(USD)/kg and individual pure lanthanum oxides were priced at $17.60 (US)/kg. Substitution of lanthanides for some of the pure lanthanum is also believed to lower the thermal expansion of the air electrode material as a result of the smaller ionic radii of other lanthanides as compared to that of lanthanum. Thus, it was discovered that the use of mixed lanthanides (Ln), mainly comprising La, Ce, Pr and Nd and minor amounts of other lanthanides and trace impurities, as a substitute for at least part of La in the air electrodes, lowers the coefficient of thermal expansion to the desired range and significantly reduces the raw material costs of such air electrodes.

The preferred unfinished mixed lanthanide compounds used in the air electrode of the invention are provided in their natural lanthanide mixture state except for Ce, and mainly comprise at least La, Ce, Pr, and Nd and minor amounts of other lanthanides and impurities. A commercially available unfinished lanthanide concentrate typically comprises primarily at least La, Ce, Pr, and Nd, or at least La, Ce, Pr, Nd and Sm, together with minor amounts of other lanthanides and impurities.

The low cost, dimensionally stable, porous, electrically conductive, air electrode of this invention is a solid solution, having a perovskite-like ($ABO_3$) crystal structure, of a lanthanide-substituted doped lanthanum manganite having the general chemical formula (1).

$$(La_{1-w-x-y}Ln_wCe_x(M_A)_y)(Mn_{1-z}(M_B)_z)O_3 \tag{1}$$

where Ln is a low cost lanthanide mixture, being either in a naturally occurring state or a partially separated and unfinished concentrated state, selected from a mixture of at least two, at least three, at least four, or at least five of without limitation, La, Ce, Pr, Nd, and Sm and other lanthanides, with the proviso that if Ln comprises a mixture of only two lanthanides, the mixture is not the combination of La and Ce; La and Ce are selected from individual species of La and Ce, respectively; $M_A$ is an A-site dopant for electrical conductivity selected from individual species of at least one of Ca, Sr or Ba, or mixtures thereof; $M_B$ is a B-site dopant for dimensional stability selected from individual species of at least one of Mg, Ni, Cr, Al or Fe, or mixtures thereof; w is from about 0.05 to 0.9, preferably about 0.1 to 0.9, most preferably about 0.4 to 0.8; x is from about 0 to 0.1; y is from about 0.1 to 0.2; and, z is about 0.05 to 0.1 mole per mole of formula (1). However, this equation is merely exemplary and any range of La, Mn and A-site and B-site dopants are embodied by this invention so long as the composition contains a finite amount of Ln as a substitute for some or all of the La. These air electrodes are novel in that their formulations contain other lanthanides, such as Nd, Pr, etc., which were not found in the prior air electrode formulations because such materials were avoided in air electrodes and considered impurities in the art. But these lanthanide mixtures in the air electrodes now render the air electrodes less expensive to fabricate and unexpectedly provide a better thermal expansion match to the solid electrolyte. The lanthanide mixture may be a substitute for part or all of the lanthanum in the air electrode formulations.

Some preferred air electrode compositions of this invention are:

$$(La_{0.2}Ln_{0.6}Ca_{0.2})(Mn_{0.95}Ni_{0.05})O_3;$$

$$(La_{0.2}Ln_{0.6}Ca_{0.2})(Mn_{0.90}Ni_{0.10})O_3;$$

and, $$(Ln_{0.8}Ca_{0.2})(Mn_{0.90}Mg_{0.10})O_3.$$

In these preferred compositions, the lanthanide mixture (abbreviated "Ln") comprises a lanthanide concentrate of at least four lanthanides of La, Ce, Pr, and Nd.

The actual composition of the commercially available lanthanide concentrate in these preferred examples is a mixture of carbonates $((CO_3)_x)$ or oxides $(O_x)$ of the following lanthanides:

$$Ln=(La_{0.598}Nd_{0.184}Pr_{0.081}Ce_{0.131}Ca_{0.002}Sr_{0.004}),$$

where Sr and Ca are trace impurities. Other examples of lanthanide concentrates commercially available are a mixture of carbonates or oxides of the following lanthanides:

$$Ln=(La_{0.68}Ce_{0.5}Pr_{0.2}Nd_{0.2}MnO_3);$$

and, $$Ln=(La_{0.67}Ce_{0.007}Pr_{0.07}Nd_{0.25}),$$

for high or low Ce concentrates, respectively. Clearly, the molar ranges and types of lanthanides in the mixture will vary in these unfinished lanthanide mixtures, since such mixtures are based on natural mixtures which have been incompletely purified to different extents. However, for purposes of this invention, the lanthanide mixtures commercially available can be characterized as containing at least a mixture of La, Ce, Pr and Nd compounds.

The lanthanide-substituted doped lanthanum manganite materials of this invention are solid solutions which preferably consist of a single phase. In these ceramic porous (i.e., about 20% to 40% porous by volume) air electrode materials, lanthanum is substituted with lower cost lanthanide compounds, such as natural lanthanide mixtures or unfinished lanthanide concentrates, in the perovskite crystal lattice, to provide a lower cost air electrode material which has excellent operational properties, such as excellent coefficient of thermal expansion match, porosity, resistivity, dimensional stability, and meets all other air electrode requirements.

As a first step in making the porous, self-supporting, air electrode tube of this invention, powdered oxides, carbonates, or other compounds that form oxides upon heating, such as oxalates, of low cost lanthanide mixtures, such as an unfinished lanthanide concentrate mainly comprising a mixture of at least La, Ce, Pr and Nd, for example, a mixture of at least $La_2O_3$, $CeO_2$, $Pr_6O_{11}$, and $Nd_2O_3$ or comparable materials, or sometimes a mixture mainly comprising a mixture of at least La, Ce, Pr, Nd and Sm, are intimately blended together with pure individual oxides, carbonates or other compounds that form oxides upon heating, of the La and Mn base metals, for example, individual $La_2O_3$ or $LaCO_3$, individual $MnO_2$, or comparable materials, and also with pure individual oxides, carbonates, or other compounds that form oxides upon heating, of the Ce, Sr, Ca, Ba, Mg, Cr, Al, Fe, or Ni dopants, for example, $CeO_2$, $SrO$, $SrCO_3$, $CaCO_3$, $BaCO_3$, $MgO$, $Cr_2O_3$, $Al_2O_3$, $Fe_2O_3$, and $NiO$, or comparable materials. Each material is accordingly weighed out in the proper proportions to give the desired lanthanide-substituted doped lanthanum manganite air electrode composition after calcining.

The powdered mixture is next pressed preferably by isostatic pressing, into a shape, preferably a cylindrical pellet form. The pellet is then calcined, preferably in air, at temperatures from about 1,300° C. to about 1,750° C., preferably about 1,500° C., for about 1 to 5 hours. The calcined pellet of doped lanthanum manganite powder with lanthanide substituted for some of the pure lanthanum is then pulverized, i.e., crushed or ground, and further screened, to provide smaller particles and a more uniform particle size distribution. Calcination and pulverization can be repeated a number of times, typically about 3 times, to provide the desired enhanced chemical homogeneity of the powder and small particle size distribution. The finished calcined and pulverized powder preferably has medium particle size between about 0.5 to 100 microns, preferably about 10 microns. The particle size distribution, emphasizing small particles, is important in providing strong, yet thin, porous air electrode tubes of this lanthanide-substituted doped lanthanum manganite composition.

The crushed calcined powder is then molded by isostatic pressing, or more usually extruded, into tubular shape. Prior to forming into a tube, the crushed calcined powder can be intimately blended with other ingredients, such as cohesion agents, pore-forming agents, binders, and wetting agents for improving the forming operations and structural properties of the "green" unsintered tube. The powder can then be mixed with from about 1% to 5% by weight of a decomposable cohesion agent, such as an organic starch, e.g., corn starch, rice starch, potato starch, or the like, to provide cohesion and plasticity for extrusion, from about 1% to 4% by weight of a decomposable pore-forming agent, such as an organic cellulose, e.g., maple wood flour, fibrous cellulose, methyl cellulose, or the like, to provide pores for gas permeation, from about 1% to 4% by weight of an organic, water-soluble binder, e.g., polyvinyl alcohol, polyvinyl acetate, paraffin wax emulsion, or the like, to provide dry strength for handling, and up to 1% by weight of an optional wetting agent, to help in extrusion, such as naphthalene-sulfonic acid condensates, with the balance of the formable mixture constituting the calcined powder, preferably from about 90 to 95% by weight.

Preferably, the particle size of the cohesion agent and pore-forming agent should be below 75 microns, and should decompose between about 100° C. and 550° C. The binder should also decompose in this temperature range. Preferably, all dry ingredients are mixed together dry and then wet mixed with the water-soluble binder dissolved in a water solution, to provide a wet formable mixture. It is preferred that the wet formable mixture is aged for about 6 to 12 hours, to promote water distribution and homogeneity. The formable mixture is then either isostatically pressed or preferably extruded into tubular shape in a "green" unsintered condition.

In order to close one end of the air electrode tube, a solid cylindrical plug of the formable mixture can then be pushed into the annulus of the tube a selected distance, usually from about 2.5 to 7 cm, from one end of the tube. The plugged or close-ended tube is then dried in air, and next sintered in air at temperatures from about 1,300° C. to 1,750° C., preferably about 1,550° C., for about 1 to 6 hours, to sinter together the air electrode tube walls and end plug, to drive off the binder, cohesion agent, pore-forming agent and wetting agent, and to provide a consolidated, sintered tube of a lanthanide-substituted doped lanthanum manganite composition. The sintered structure is then cooled to form a unitary sintered mass. The tube can then be cut along a portion of the plugged closed end and then smoothed or rounded, or otherwise finished for end use. The form of the air electrode is usually a thin walled, tubular form as shown in FIG. 1, but it can also be in bulk form and in the form of flat or corrugated plates depending on the multi-cell generator configuration.

In a high temperature, solid oxide fuel cell and generator, this porous, self-supported, electrically conductive, air electrode tube is substantially covered on its exterior by a dense, gas-tight, oxygen ion conductive, solid oxide electrolyte, such as yttria-stabilized zirconia, e.g., $(Y_2O_3)_{0.1}(ZrO_2)_{0.9}$, except for an axially elongated radial segment, preferably extending along the entire active cell length, which is covered on its exterior in this segment by a dense, gas-tight, electrically conductive, interconnect, such as doped lanthanum chromite. The solid electrolyte is substantially covered by a porous, electrically conductive, fuel electrode, such as nickel-zirconia cermet, and a distinct layer of nickel-zirconia cermet also covers the interconnect. The solid electrolyte and fuel electrode are discontinuous along the radial segment and are spaced apart from the interconnect to avoid direct electrical contact with the interconnect and, consequently, short-circuiting of the fuel cell. A plurality of solid oxide fuel cells can be series-parallel connected to form a multi-cell generator for electrical power generation as is well known in the art. The use of lanthanides and lanthanide mixtures in the air electrode as a substitute for lanthanum results in a lower cost air electrode without degrading the air electrode operational requirements.

The following Examples further illustrate the air electrodes of the invention and are intended to be purely exemplary without limiting the invention in any way whatsoever.

EXAMPLE 1

A low cost, stable, electrically conductive, gas permeable, self-supporting, thin-walled air electrode tube of this invention was made from a low cost lanthanide mixture, i.e., a lanthanide concentrate, as a substitute for some pure lanthanum, and compared in terms of thermal expansion coefficient, porosity, electrical resistivity and cyclic shrinkage, to another air electrode tube made from pure individual lanthanum. The low cost air electrode tube was prepared by first mixing together the dry powdered ingredients in Table 1.

TABLE 1

| Material | Grams | Grade |
|---|---|---|
| Lanthanide Concentrate Carbonate (comprising mainly La, Ce, Pr, and Nd) | 89.9 | Molycorp 5211 |
| $CeO_2$ | 6.2 | Aldrich/99.9% |
| $CaCO_3$ | 10.0 | Fisher/Certified |
| $MnO_2$ | 40.9 | Chemical/HP |
| NiO | 0.7 | Cerac/Pure |
| $Cr_2O_3$ | 1.5 | Fisher/Certified |

Molycorp 5211 lanthanide concentrate carbonate is sold by Molycorp of New York. This lanthanide concentrate is a low cost lanthanide mixture that is derived from a natural lanthanide mixture mined from rare earth oxide mines in Mountain Pass, Calif. and has been subjected to incomplete separation of its cerium content. This material is sold as a carbonate and contains a mixture of carbonates of La, Ce, Pr, and Nd and sometimes trace Sm and other lanthanides and other impurities. Of course, since this is a naturally derived product, the concentrations of the individual lanthanide components varies from batch to batch. Molycorp 5211 lanthanide concentrate has been expressed as 69.3% $La_2O_3$, 4.7% $CeO_2$, 7.6% $Pr_6O_{11}$, and 18.06% $Nd_2O_3$, in weight percent on an oxide basis. Molycorp 5211 lanthanide concentrate has also been expressed as a molar based $La_{0.598}Nd_{0.0184}Pr_{0.081}Ce_{0.131}Ca_{0.002}Sr_{0.004}$. However, it should be understood that the use of any lanthanide mixture that includes a mixture of at least two to five of La, Ce, Pr, Nd, Sm and other lanthanides and trace impurities for an air electrode composition is encompassed by this disclosure.

The above raw materials listed in Table 1 were intimately mixed together and this mixture was calculated to provide the desired sample composition upon sintering. The mixed powder was compressed into pellets and then calcined three times at about 1,500° C. in air for about 4 hours. After each calcination, the calcined powder was pulverized in order to enhance chemical homogeneity and repelletized for the next calcination. The finished calcined powder had about a 10 micron medium particle size. The dry calcined powder was then mixed with methylcellulose binder to form an aqueous formable paste for extrusion. The formable paste was then extruded in a tubular form (65 cm long, 1.58 cm OD) and next fired at 1,550° C. for about 4 hours to form a sintered, porous (about 30% porosity), self-supported air electrode tubes of the composition listed in Table 2. The properties of this air electrode tube are also listed in Table 2. And, for comparison, another air electrode composition was made by using an individual species of pure lanthanum oxide (approximately 99.9% pure) rather than a low cost lanthanide mixture, and its properties are also included in Table 2.

TABLE 2

| Material | Porosity (%) | Electrical Resistivity at 1,000° C. (mΩ-cm) | Thermal Expansion Coefficient at 25° C. to 1,000° C. ($10^{-6}$ m/m/°C.) | Cyclic Shrinkage (% per cycle) |
|---|---|---|---|---|
| [($La_{0.516}Nd_{0.130}Pr_{0.054}Sm_{0.001}Sr_{0.001}$) $Ca_{0.200}Ce_{0.105}$][$Mn_{0.94}Ni_{0.02}Cr_{0.04}$]$O_3$ | 31 | 20.8 | 10.5 | 0.002 |
| [$La_{0.7}Ca_{0.200}Ce_{0.105}$][$Mn_{0.94}Ni_{0.02}Cr_{0.04}$]$O_3$ | 30 | 12.5 | 10.8–10.9 | 0.001 |

The above results show that the low cost lanthanide-substituted doped lanthanum manganite air electrode composition of this invention is gas permeable, electrically conducting, and dimensionally stable. The advantage of this composition is its lower fabrication costs and that its coefficient of thermal expansion more closely matches that of a $(Y_2O_3)_{0.1}(ZrO_2)_{0.9}$ solid electrolyte which has a coefficient of thermal expansion of about $10.5 \times 10^{-6}$ m/m/°C.

EXAMPLE 2

Low cost, stable, electrically conductive, gas permeable, air electrode test bars were prepared based on the general formula (2), a subset of general formula (1) listed hereinabove:

$$(La_{1-w-0.2}Ln_wCa_{0.2})(Mn_{1-y}(Ni \text{ or } Mg)_y)O_3 \qquad (2)$$

where w=0.4 to 0.8, preferably 0.4, 0.6, or 0.8, and y=0.05 to 0.1, preferably 0.05 or 0.1. The tubes were made with lanthanide mixtures of Molycorp 5211 lanthanide concentrate carbonate as in Example 1 (abbreviated for simplicity as "Ln") which again comprises a mixture of at least La, Ce, Pr, and Nd and other trace lanthanides and impurities. The lanthanide concentrate used in this Example was reported as a molar based composition of $La_{0.598}$ $Nd_{0.184}Pr_{0.081}Ce_{0.131}Ca_{0.002}Sr_{0.004}$, with Ca and Sr being trace impurities. The Ln was intimately blended together with individual species of $CaCO_3$, $MnO_2$, and NiO or $MgCO_3$ for calcination. The air electrode powder was prepared by three solid state calcinations similar to that described in Example 1. The finished calcined powder was isostatically pressed into rectangular sample test bars 2.54 cm long by 0.635 cm thick by 0.635 cm wide, and sintered at about 1,550° C. into bar samples with about 30% porosity by the method described in Example 1. Thermal expansion coefficients were measured for each test bar and the results are listed in Table 3, and are compared to that of an air electrode composition made from pure individual lanthanum compounds and that of the yttria-stabilized zirconia solid oxide electrolyte.

TABLE 3

| Material | Function | Coefficient of Thermal Exapansion ($10^{-6}$ m/m/°C.) |
|---|---|---|
| $(Ln_{0.8}Ca_{0.2})(Mn_{0.95}Ni_{0.05})O_3$ | Air Electrode | 9.6 |
| $(La_{0.2}Ln_{0.6}Ca_{0.2})(Mn_{0.95}Ni_{0.05})O_3$ | Air Electrode | 10.5 |
| $(La_{0.4}Ln_{0.4}Ca_{0.2})(Mn_{0.95}Ni_{0.05})O_3$ | Air Electrode | 10.7 |
| $(Ln_{0.8}Ca_{0.2})(Mn_{0.90}Ni_{0.10})O_3$ | Air Electrode | 9.5 |
| $(La_{0.2}Ln_{0.6}Ca_{0.2})(Mn_{0.90}Ni_{0.10})O_3$ | Air Electrode | 10.4 |
| $(La_{0.4}Ln_{0.4}Ca_{0.2})(Mn_{0.90}Ni_{0.10})O_3$ | Air Electrode | 10.7 |
| $(Ln_{0.8}Ca_{0.2})(Mn_{0.90}Mg_{0.10})O_3$ | Air Electrode | 10.6 |
| $(La_{0.2}Ln_{0.6}Ca_{0.2})(Mn_{0.90}Mg_{0.10})O_3$ | Air Electrode | 10.9 |
| $(La_{0.4}Ln_{0.4}Ca_{0.2})(Mn_{0.90}Mg_{0.10})O_3$ | Air Electrode | 11.2 |
| Comparative Examples | | |
| $(Y_2O_3)_{0.1}(ZrO_2)_{0.9}$ | Solid Electrolyte | 10.5 |
| $(La_{0.8}Ca_{0.2})(Mn_{0.95}Ni_{0.05})O_3$ | Air Electrode | 10.8–10.9 |
| $(La_{0.8}Ca_{0.2})MnO_3$ | Air Electrode | 10.9 |

Table 3 indicates that the coefficient of thermal expansion is primarily dominated by the Ln/La ratios. For the air electrode of the invention the preferred Ln/La ratio is in the range of 3 to 4. Also, to a lesser degree, the coefficient of thermal expansion was dependent on the Ni or Mg doping in the B-site.

Furthermore, three low cost air electrode compositions listed in Table 3 which are $(La_{0.2}Ln_{0.6}Ca_{0.2})(Mn_{0.95}Ni_{0.05})$ $O_3$; $(La_{0.2}Ln_{0.6}Ca_{0.2})$ $(Mn_{0.90}Ni_{0.10})O_3$; and, $(Ln_{0.8}Ca_{0.2})$ $(Mn_{0.90}Mg_{0.10})O_3$, were found to possess coefficients of thermal expansion ($10.5\pm0.1\times10^{-6}$/°C.) which closely match that of the yttria-stabilized zirconia solid electrolyte ($10.5\times 10^{-6}$/°C.). These three compositions were further tested for electrical conductivity and dimensional stability, which results are listed in Table 4.

TABLE 4

| Material | Porosity (%) | Electrical Resistivity at 1,000° C. (mΩ-cm) | Thermal Expansion Coefficient at 25° C. to 1,000° C. ($10^{-6}$m/m/°C.) | Cyclic Shrinkage (% per cycle) |
|---|---|---|---|---|
| $(La_{0.2}Ln_{0.6}Ca_{0.2})(Mn_{0.95}Ni_{0.05})O_3$ | 30 | 14.4 | 10.5 | 0.000 |
| $(La_{0.2}Ln_{0.6}Ca_{0.2})(Mn_{0.90}Ni_{0.90})O_3$ | 31 | 18.9 | 10.4 | 0.004 |
| $(Ln_{0.8}Ca_{0.2})(Mn_{0.90}Mg_{0.10})O_3$ Example 1 | 31 | 20.3 | 10.6 | 0.000 |
| $(La_{0.516}Nd_{0.130}Pr_{0.054}Sm_{0.001}Sr_{0.001})Ca_{0.200}Ce_{0.105}(Mn_{0.94}Ni_{0.02}Cr_{0.04})O_3$ Comparative Example | 31 | 20.8 | 10.5 | 0.002 |
| $(La_{0.7}Ca_{0.200}Ce_{0.105})(Mn_{0.94}Ni_{0.02}Cr_{0.04})O_3$ | 30 | 12.5 | 10.8–10.9 | 0.001 |

Figure 2:
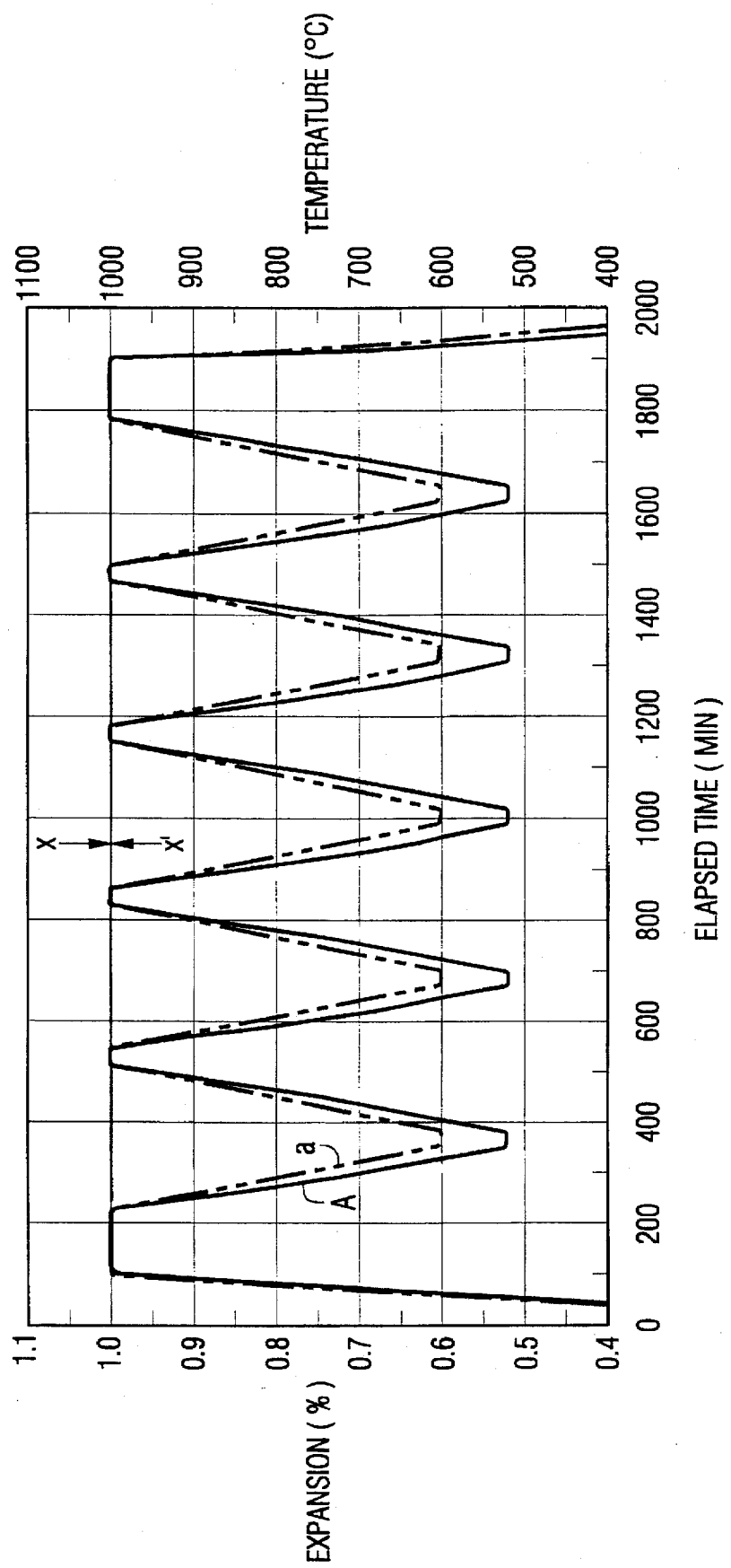
FIG. 2 is a graphical diagram showing total shrinkage for heat cycled low cost air electrode material $(La_{0.2}Ln_{0.6}Ca_{0.2})(Mn_{0.95}Ni_{0.05})O_3$, where Ln is a lanthanide mixture of at least La, Ce, Pr and Nd, a preferred air electrode material in accordance with the invention.
Figure 3:
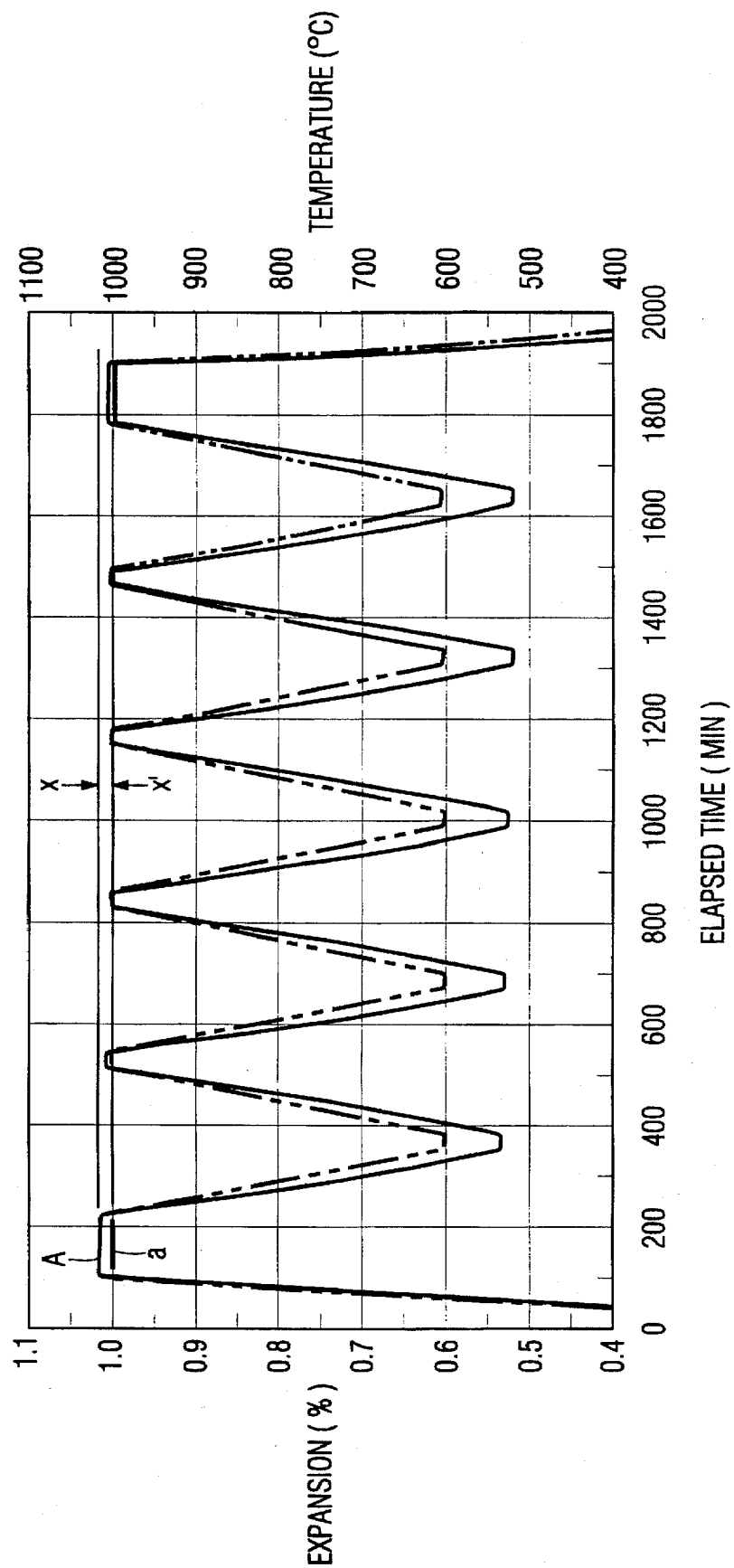
FIG. 3 is a graphical diagram showing total shrinkage for heat cycled low cost air electrode material $(La_{0.2}Ln_{0.6}Ca_{0.2})(Mn_{0.90}Ni_{0.10})O_3$, where Ln is a lanthanide mixture of at least La, Ce, Pr and Nd, another preferred air electrode material in accordance with the invention; and, FIG. 4 is a graphical diagram showing total shrinkage for heat cycled low cost air electrode material $(Ln_{0.8}Ca_{0.2})(Mn_{0.90}Mg_{0.10})O_3$, where Ln is a lanthanide mixture of at least La, Ce, Pr and Nd, still another preferred air electrode material in accordance with the invention.
Figure 4:
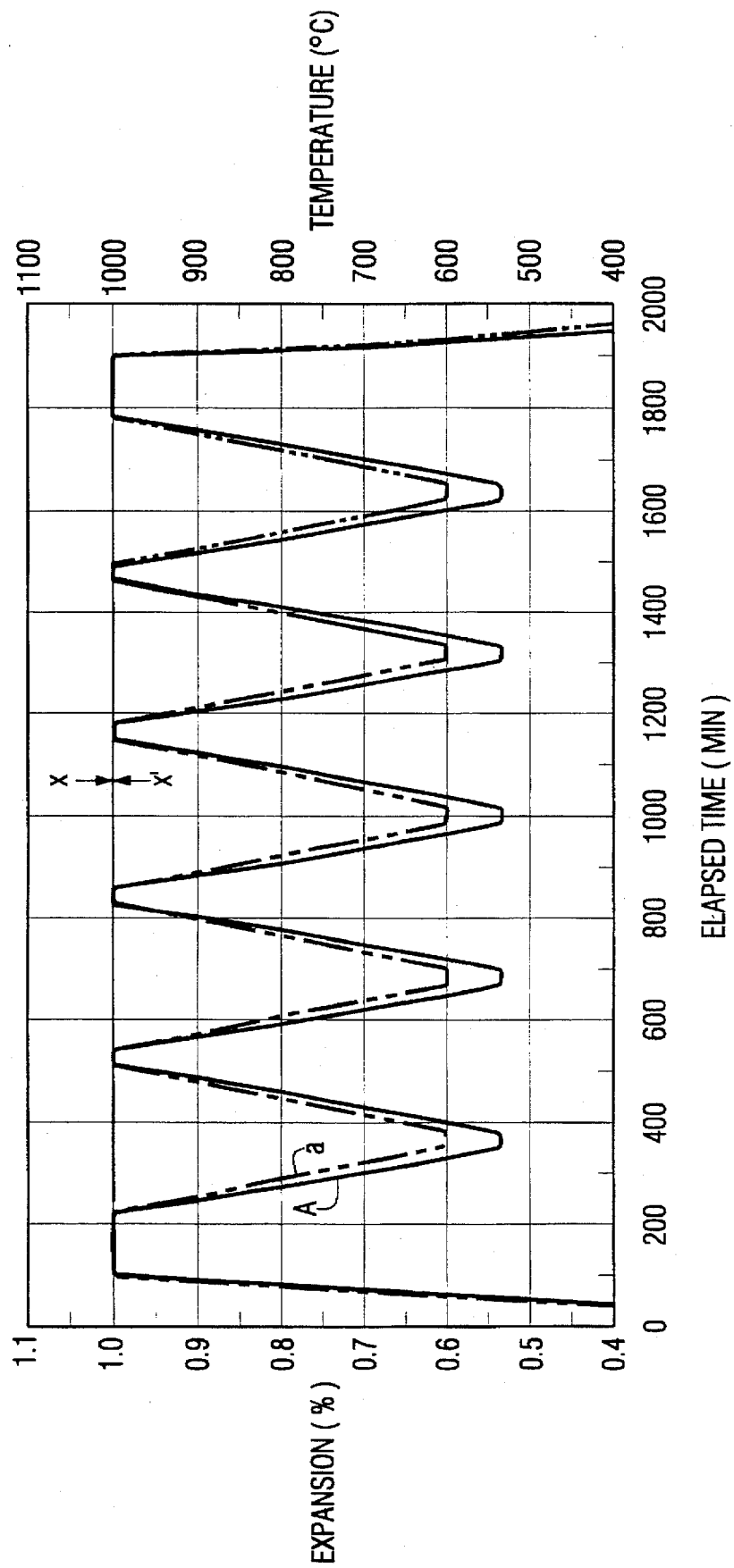

Results of total shrinkage for the heat cycled materials of Example 2 listed in Table 4 are diagrammatically shown in FIGS. 1–3, respectively. In the Figures, the capital letter A shows the expansion curve and the small letter a shows the temperature curve. Thus, temperature curve a proceeds up to 1,000° C. and holds, drops to 600° C. and holds, and raises to 1,000° C. and again holds. The final shrinkage is determined as the difference between peaks on the expansion curve A, at a temperature of 1,000° C., shown as X–X'.

All of the U.S. patents mentioned in this specification are incorporated by reference herein in their entireties.

The invention having been disclosed in connection with the foregoing embodiments and examples, additional examples and embodiments will now be apparent to persons skilled in the art. The invention is not intended to be limited to the embodiments and example specifically mentioned, and accordingly reference should be made to the appended claims rather than the foregoing discussion of preferred embodiments and examples, to assess the spirit and scope of the invention in which exclusive rights are claimed.

We claim:

1. A method of making a lanthanide-substituted, dimensionally and thermally stable, electrically conductive, porous ceramic air electrode structure, which comprises:

(a) providing powdered oxides or carbonates of a natural lanthanide mixture comprising at least two lanthanides from the group of La, Ce, Pr, Nd, and Sm;

(b) providing powdered oxides or carbonates of individual species of La and Mn, at least one A-site dopant from the group of individual species of Ca, Sr, Ba, and Ce, and, at least one B-site dopant from the group of individual species of Mg, Ni, Cr, Al and Fe;

(c) blending together said powdered oxides or carbonates of the lanthanide mixture with said powdered oxides or carbonates of said individual species of La and Mn, said at least one A-site dopant from the group of individual species of Ca, Sr, Ba, and Ce, and, said at least one B-site dopant from the group of individual species of Mg, Ni, Cr, Al and Fe, in appropriate proportions to provide a lanthanide-substituted doped $LaMnO_3$ composition after calcining;

(d) pressing the blended powder into a shape;

(e) calcining the pressed shape at a temperature of from about 1,300° C. to 1,750° C. for about 1 to 5 hours;

(f) pulverizing the calcined shape to powder form;

(g) blending the calcined powder with at least one from the group of a cohesion agent, a pore-forming agent, a water-soluble binder, a wetting agent, and water to provide a formable mixture, where the calcined powder constitutes from about 90% to 95% by weight of the formable mixture;

(h) molding the formable composition into a shaped air electrode structure; and (i) sintering the shaped air electrode structure in air at a temperature from about 1,300° C. to 1,750° for about 1 to 6 hours, to form a porous, shaped, air electrode structure of the lanthanide-substituted doped $LaMnO_3$ composition.

2. The method of claim 1, in which steps (d)–(f) are repeated one or more times.

3. The method of claim 1, in which step (h) further includes molding the formable mixture into a tubular shape.

4. The method of claim 3, in which sometime between steps (h) and (i) one end of the tube is plugged with additional formable mixture.

5. The method of claim 1, in which the lanthanide mixture comprises a mixture of at least La, Ce, Pr and Nd.

6. The method of claim 1, in which the lanthanide mixture comprises a mixture of at least La, Ce, Nd, Pr, and Sm.

7. The method of claim 1, in which the lanthanide-substituted doped lanthanum manganite air electrode composition has the chemical formula (1):

$$(La_{1-w-x-y}Ln_w Ce_x(M_A)_y)(Mn_{1-z}(M_B)_z)O_3 \tag{1}$$

where Ln is a lanthanide mixture either in a natural state or an unfinished concentrated state, selected from a mixture comprising at least two of La, Ce, Pr, Nd, and Sm, with the proviso that if Ln comprises a mixture of only two lanthanides, the mixture is not the combination of La and Ce; La and Ce are selected from individual species of La and Ce, respectively; $M_A$ is an A-site dopant for electrical conductivity selected from individual species of at least one of Ca, Sr or Ba, or mixtures thereof; $M_B$ is a B-site dopant for dimensional stability selected from individual species of at least one of Mg, Ni, Cr, Al or Fe, or mixtures thereof; w is from about 0.05 to 0.9; x is from about 0 to 0.1; y is from about 0.1 to 0.2; and, z is about 0.05 to 0.1 mole per mole of formula (1).

8. The method of claim 1, in which after step (i), a dense, gas-tight, oxygen ion conductive, yttria- or calcia-stabilized zirconia ceramic solid electrolyte is applied to the outer periphery of the air electrode to contact and substantially surround the air electrode, and then a porous nickel- or cobalt-zirconia cermet fuel electrode is applied to the outer periphery of the solid electrolyte to contact and substantially surround the solid electrolyte, to form a solid oxide fuel cell.

9. The method of claim 1, in which in step (h) the electrode structure is molded by extrusion or isostatic pressing.

10. The method of claim 1, in which the air electrode has a porosity from about 20 to 40% by volume (60% to 80% of theoretical density), a coefficient of thermal expansion from about $10.4 \times 10^{-6}$ to $10.6 \times 10^{-6}$/°C. in the range of about 25° C. to 1,000° C., and an electrical resistivity of from about 10 to 25 Ω-cm at about 1,000° C.

11. A lanthanide-substituted, dimensionally and thermally stable, electrically conductive, porous air electrode composition, which comprises the chemical formula (1):

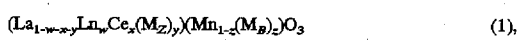

$$(La_{1-w-x-y}Ln_wCe_x(M_Z)_y)(Mn_{1-z}(M_B)_z)O_3 \quad (1),$$

where Ln is a lanthanide mixture comprising at least two of La, Ce, Pr, Nd, and Sm, with the proviso that if Ln comprises a mixture of only two lanthanides, the mixture is not the combination of La and Ce; La and Ce are selected from individual species of La and Ce, respectively; $M_A$ is an A-site dopant for electrical conductivity selected from individual species of at least one of Ca, Sr or Ba, or mixtures thereof; $M_B$ is a B-site dopant for dimensional stability selected from individual species of at least one of Mg, Ni, Cr, Al or Fe, or mixtures thereof; w is from about 0.05 to 0.9; x is from about 0 to 0.1; y is from about 0.1 to 0.2; and, z is about 0.05 to 0.1 mole per mole of formula (1).

12. The air electrode composition of claim 11, in which w is from about 0.4 to 0.8.

13. The air electrode composition of claim 11, in which the lanthanide mixture comprises a natural mixture of lanthanides.

14. The air electrode composition of claim 11, in which the lanthanide mixture comprises an unfinished lanthanide concentrate.

15. The air electrode composition of claim 11, in which Ln comprises at least three of La, Ce, Pr, Nd, and Sm.

16. The air electrode composition of claim 11, in which the Ln comprises primarily a mixture of La, Ce, Pr, and Nd.

17. The air electrode composition of claim 11, in which the Ln comprises primarily a mixture of La, Ce, Pr, Nd, and Sm.

18. The air electrode composition of claim 11, in which the air electrode is from about 20 to 40% porous by volume (60% to 80% of theoretical density), the electrical resistivity at 1,000° C. is from about 10 to 25 Ω-cm, and, the coefficient of thermal expansion in the range of from about 25° C. to 1,000° C. is from about $10.4 \times 10^{-6}$ to $10.6 \times 10^{-6}$/°C.

19. The air electrode composition of claim 11, in which the composition has the chemical formula (2):

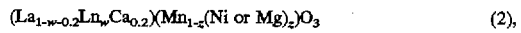

$$(La_{1-w-0.2}Ln_wCa_{0.2})(Mn_{1-z}(Ni\ or\ Mg)_z)O_3 \quad (2),$$

where w is from about 0.4 to 0.8; and, y is from about 0.05 to 0.1.

20. A tubular solid oxide fuel cell, which comprises:
a porous self-supporting, inner air electrode tube;
a gas-tight solid electrolyte substantially surrounding the outer periphery of the air electrode tube; and,
a porous outer fuel electrode substantially surrounding the solid electrolyte,
where the solid electrolyte and fuel electrode are discontinuous and have an interconnect disposed on the air electrode in the discontinuity, in which the air electrode is a low cost, lanthanide-substituted, dimensionally and thermally stable material, electrically conductive material selected comprising formula (1):

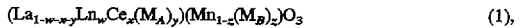

$$(La_{1-w-x-y}Ln_wCe_x(M_A)_y)(Mn_{1-z}(M_B)_z)O_3 \quad (1),$$

where Ln is a lanthanide mixture either in a natural state or an unfinished concentrated state, comprising a mixture of at least two of La, Ce, Pr, Nd, and Sm and minor amounts of other lanthanides (Eu, Gd, Tb, Dy, Ho, Er, Tm, Yb, and Lu), with the proviso that if Ln comprises a mixture of only two lanthanides, the mixture is not the combination of La and Ce; La and Ce are selected from individual species of La and Ce, respectively; $M_A$ is an A-site dopant for electrical conductivity selected from individual species of at least one of Ca, Sr or Ba, or mixtures thereof; $M_B$ is a B-site dopant for dimensional stability selected from individual species of at least one of Mg, Ni, Cr, Al or Fe, or mixtures thereof; w is from about 0.05 to 0.9; x is from about 0 to 0.1; y is from about 0.1 to 0.2; and, z is about 0.05 to 0.1 mole per mole of formula (1).

21. The fuel cell of claim 20, in which the solid electrolyte is made of yttria- or calcia-stabilized zirconia, the interconnect is made of doped lanthanum chromite, and the fuel electrode is made of nickel- or cobalt-zirconia cermet.

22. A fuel cell generator made by series and parallel connecting a plurality of fuel cells of claim 21.

* * * * *